F. W. DECKER.
COMBINED FERTILIZER DISTRIBUTER AND PLANTER.
APPLICATION FILED JAN. 8, 1909.
940,517.
Patented Nov. 16, 1909.
2 SHEETS—SHEET 1.
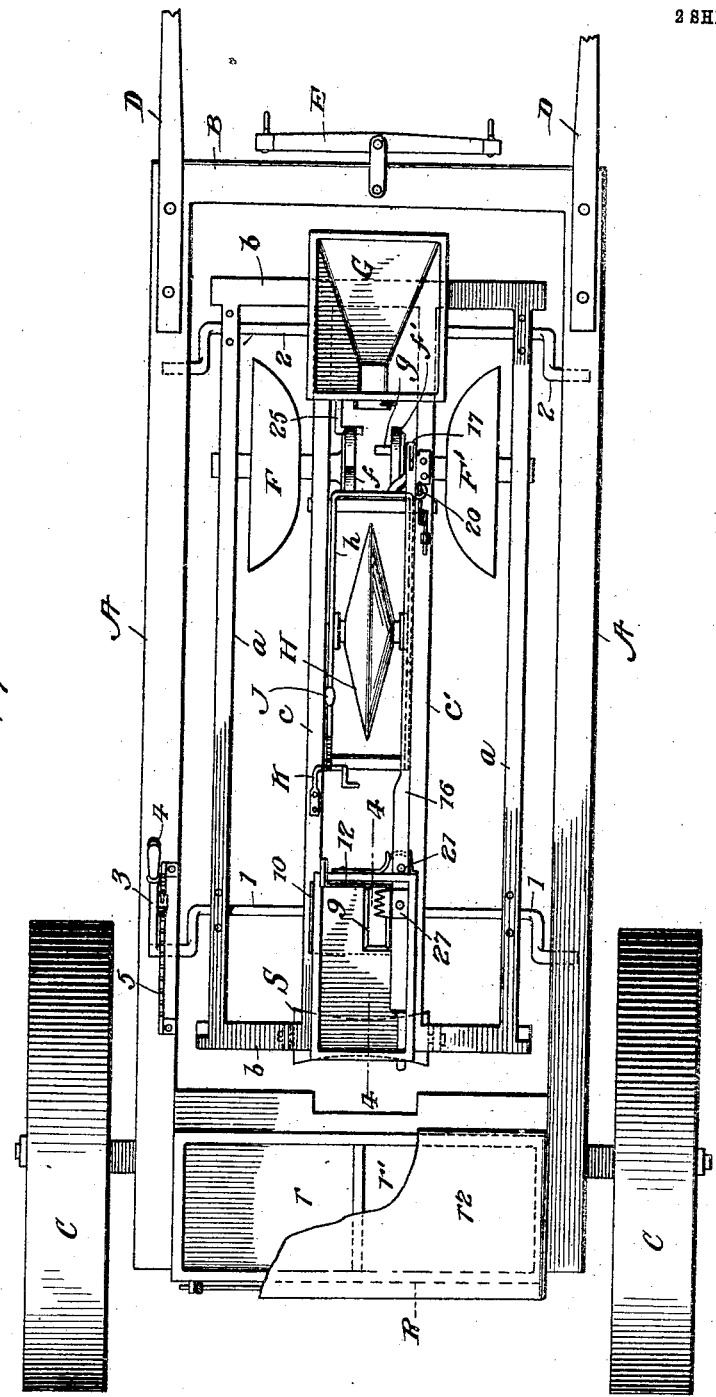
WITNESSES
INVENTOR
FREDRICK W. DECKER,
BY
ATTORNEYS

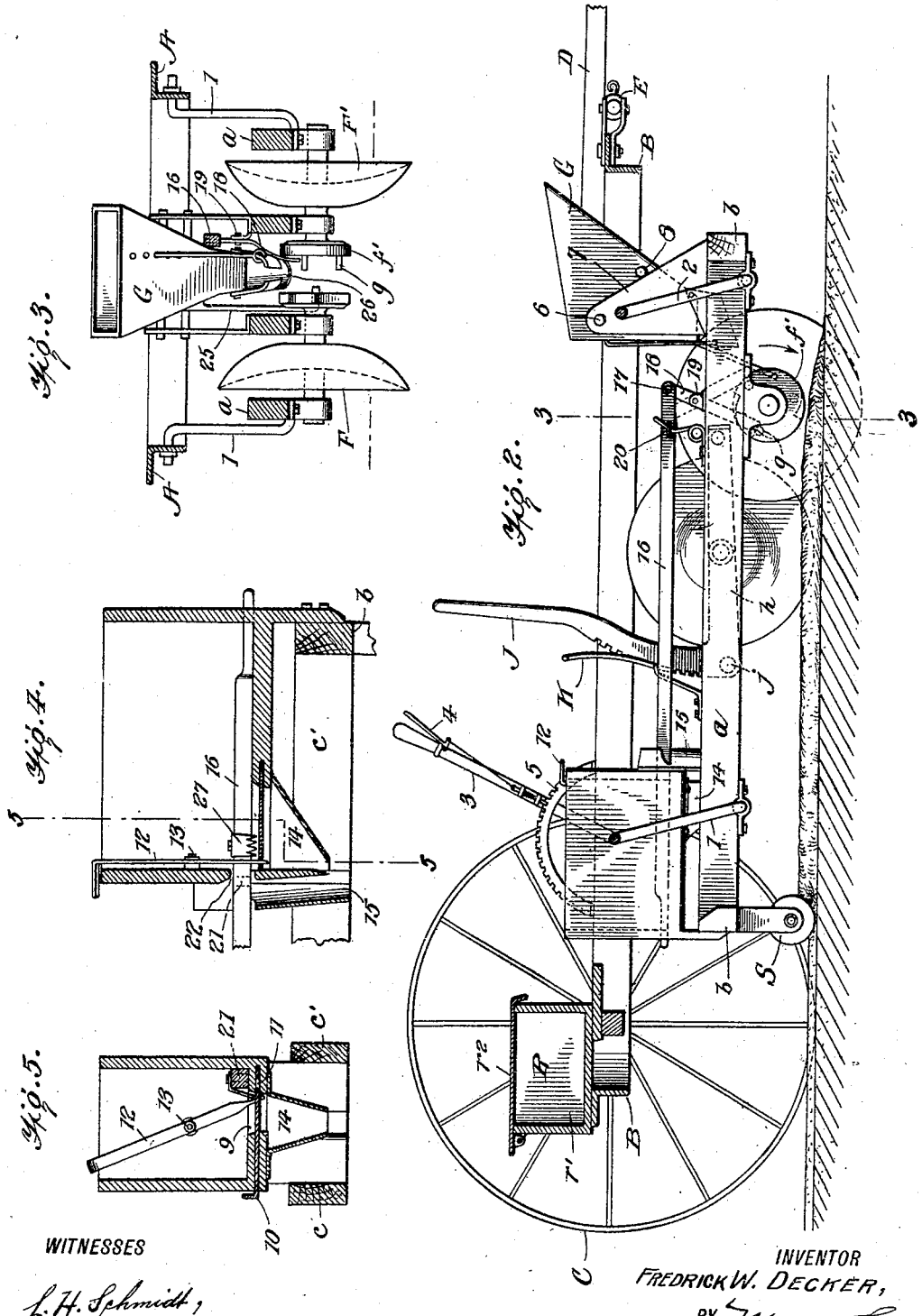

UNITED STATES PATENT OFFICE.

FREDRICK W. DECKER, OF BRUNSWICK, GEORGIA, ASSIGNOR OF ONE-THIRD TO ALBERT FENDIG, OF BRUNSWICK, GEORGIA.

COMBINED FERTILIZER-DISTRIBUTER AND PLANTER.

940,517. Specification of Letters Patent. Patented Nov. 16, 1909.

Application filed January 8, 1909. Serial No. 471,282.

*To all whom it may concern:*

Be it known that I, FREDRICK W. DECKER, a citizen of the United States, residing at Brunswick, in the county of Glynn and State of Georgia, have invented an Improvement in a Combined Fertilizer-Distributer and Planter, of which the following is a specification.

My invention relates to improvements in cotton planting and fertilizer distributing devices and consists in the combinations, constructions and arrangements herein described and claimed.

The main object of my invention is to provide a device which has the advantage over the ordinary type of planter in that the work in carrying out the operation is materially reduced. To this end I have provided a two-wheeled machine which is capable of delivering the fertilizer, drilling the ground preparatory to planting the seed, depositing the seed in the drill, and covering the seed after it is planted.

A further object of my invention is to provide a device containing novel mechanism by which the seed may be planted in hills or may be sown in a drill in a continuous row.

A further object of my invention is to provide an adjustable frame for the planting and distributing mechanism which will enable the latter to be raised or lowered when it is being used in a field so as to avoid stumps or rocks in its path.

Other objects and advantages will appear in the following specification and the novel features of the invention will be particularly pointed out in the appended claims.

My invention is illustrated in the accompanying drawings, in which—

Figure 1 is a plan view of the device. Fig. 2 is a side view of the device, certain portions being in section. Fig. 3 is a section along the line 3—3 of Fig. 2. Fig. 4 is a section along the line 4—4 of Fig. 1. Fig. 5 is a section along the lines 5—5 of Fig. 4.

In carrying out my invention I provide a main frame consisting of the side pieces A, and the end pieces B. Toward the rear end of the frame are journaled the wheels C. To the front end are secured the shafts D and the singletree E. Journaled in the main frame are the crank shafts 1 and 2, the former being provided with the hand lever 3 having the locking lever 4 which coöperates with a toothed arc 5 in order to lock the lever in any desired position.

Within the main frame is a second rectangular frame comprising the side members $a$, the end members $b$ and longitudinal beams $c$ $c'$. The disk plow F is journaled between the beam $c$ and the side member $a$ and its shaft is provided with a ratchet wheel $f$. A similar disk plow F' is journaled between the beam $c'$ and the side member $a$ and its shaft carries a wheel $f'$ which is provided with the pins $g$, as shown in Fig. 1.

The guano hopper G is pivotally supported at 6 upon the uprights 7 at the forward end of the machine. The stops 8 prevent the hopper from swinging out of the vertical by the engagement with the sloping sides of the uprights 7. The hopper, however, may be tilted in the opposite direction, as hereinafter explained. In the bottom of the seed hopper is an exit opening 9 closed by a slide 10 which has a small slot 11 arranged to register with the larger opening 9 for the distribution of the seed contained in the hopper. The slide 10 may be manipulated by the lever 12 which is pivoted at 13. An inclined seed chute 14 communicates with a spout 15 for depositing the seed.

Referring now to Figs. 2 and 4 it will be seen that there is a rod 16 extending longitudinally of the device and arranged to reciprocate back and forth. The rod 16 is pivotally secured at 17 to an arm or lever 18 which is fulcrumed at 19 upon a bracket carried by the longitudinal beam $c'$. The lower end of the lever 18 projects into the path of the pins $g$ carried by the wheel $f'$ as clearly shown in Fig. 3, so that when the latter is revolved the pins engage the arm 18 in succession and at each engagement the rod 16 is reciprocated rearwardly and is brought back into position by the spring 20 when the pin has passed out of engagement with the lever. The rod 16 is provided with an opening 21, shown clearly in dotted lines in Fig. 4. When the rod is reciprocated this opening is brought within the hopper and the seed falls into it and is drawn out through the side opening 22 and deposited in the spout 15. This opening 21 may be plugged up and the slide 10 may be used when the seed is to be planted in drills.

In order to gage the depth of the drill or furrow I have arranged the adjustable disk H. This is journaled in the rectangular frame $h$ having an upright lever J which turns the frame about the pivot $j$. The lever is provided with a series of teeth into which the spring retaining member K is permitted to enter to support the frame in any desired position.

In order to distribute the fertilizer evenly the hopper G is given a jolting motion by means of the engagement of an arm 25 secured to the hopper and having a laterally extending end adapted to be brought into contact with the ratchet wheel $f$.

At the rear end of the machine is a receptacle R divided into two parts $r$ and $r'$, one being for seed and the other for fertilizer. The receptacle has a cover $r^2$ which may be used as a seat for the driver of the machine. The rear end of the adjustable frame carries a roller S, which follows along the furrow in which the seed is planted and covers up the seed.

From the foregoing description of the various parts of the device the operation thereof may be readily understood. The seed and fertilizer hoppers are filled as described. When the device is started the frame carrying the operating parts is lowered by means of the lever 3 to the proper position. The disk plows F and F' are rotated and in the rotation of the disk F the guano hopper is cause dto swing backward and forward on its pivots 6, each time being brought up suddenly against the uprights 7 by the arm 25 engaging the ratchet wheel $f$. This jolting motion causes the fertilizer to be fed out through the spout 26, where it is immediately covered by the disk plows F and F' following it. The revolving plow H makes a drill or furrow of the proper depth, this depth being regulated, as before explained, by means of the lever J. When it is desired to plant in hills, the slide 10 is closed when it occupies the position shown in Fig. 5. The engagement of the pins $g$ of the wheel $f'$ with the lever 18 reciprocates the rod 16 and the seed is fed through the spout 15 as it is brought forward in the opening 21. The roller S following covers up the seed and the planting is completed. When it is desired to plant in a continuous furrow the lever 12 is shifted to bring the opening 11 in the slide 10 in registration with the opening 9, when the grain is caused to fall into the spout 14 in a continuous stream, being agitated by the member 27 on the rod 16.

This device will also plant peas, millet, broom corn, popcorn, rice, velvet beans, or any other grain.

I am aware that other forms of the device based upon the same general idea might be made, but I consider as my own, and desire to claim all such modifications as fairly fall within the scope of my invention.

What I claim is:

1. In a combined fertilizer distributing and planting device, a main frame, a second frame suspended within said main frame, means for raising or lowering said second frame, a fertilizer hopper pivoted to said second frame, means for agitating said hopper, a pair of disk plows secured to said frame in the rear of said hopper, a drill disk carried by said frame, means for raising and lowering said disk, a seed hopper in the rear of said drill disk, and means operated by one of said disk plows for feeding grain from said seed hopper.

2. In a combined fertilizer distributing and planting device, a main frame, a second frame within said main frame, a pair of parallel crank axles for suspending said second frame from said main frame, a pivoted fertilizer hopper carried upon said second frame, a pair of disk plows mounted in said second frame, one of said disk plows being provided with a ratchet wheel arranged to engage an arm on said hopper for agitating the same, a seed hopper, a reciprocating rod for feeding the seed from said hopper, a lever attached to one end of said rod and a disk secured to one of said disk plows and provided with pins arranged to engage the lever for operating the reciprocating rod.

3. In a combined fertilizer distributer and planter, a main frame, a second frame suspended within said main frame, means for raising and lowering said second frame and for maintaining it in a horizontal position, a fertilizer hopper carried by said second frame, a pair of disk plows carried by said second frame, a seed hopper, means for agitating said fertilizer hopper by the movement of one of said disk plows, means for feeding seed periodically by the movement of the other of said disk plows, an adjustable disk drill secured to said frame intermediate said disk plows and said seed hopper, and a roller secured to said frame in the rear of said seed hopper.

FREDRICK W. DECKER.

Witnesses:
J. H. MORGAN,
WM. NUSSBAUM.